US012707149B2

(12) United States Patent
Lee

(10) Patent No.: US 12,707,149 B2
(45) Date of Patent: Aug. 11, 2026

(54) RUNTIME POSTURE—POSITION INACCURACY COMPENSATION IN CAMERA OIS SYSTEMS

(71) Applicant: Google LLC, Mountain View, CA (US)

(72) Inventor: Jin Yu Lee, Mountain View, CA (US)

(73) Assignee: Google LLC, Mountain View, CA (US)

( * ) Notice: Subject to any disclaimer, the term of this patent is extended or adjusted under 35 U.S.C. 154(b) by 26 days.

(21) Appl. No.: 18/905,387

(22) Filed: Oct. 3, 2024

(65) Prior Publication Data

US 2025/0047980 A1 Feb. 6, 2025

Related U.S. Application Data

(60) Provisional application No. 63/587,690, filed on Oct. 3, 2023.

(51) Int. Cl.

| | |
|---|---|
| ***H04N 23/68*** | (2023.01) |
| ***G02B 27/64*** | (2006.01) |
| ***G03B 5/00*** | (2021.01) |
| ***H04N 17/00*** | (2006.01) |

(52) U.S. Cl.
CPC ......... *H04N 23/687* (2023.01); *G02B 27/646* (2013.01); *G03B 5/00* (2013.01); *H04N 17/002* (2013.01); *G03B 2205/0007* (2013.01)

(58) Field of Classification Search
CPC ............... H04N 23/687; H04N 17/002; H04N 23/6812; G02B 27/646; G03B 5/00; G03B 2205/0007
See application file for complete search history.

(56) References Cited

U.S. PATENT DOCUMENTS

2015/0014729 A1 1/2015 Ito et al.
2015/0050760 A1 2/2015 Imazu et al.
2015/0364938 A1 12/2015 Lapetina et al.
(Continued)

FOREIGN PATENT DOCUMENTS

CN 107546863 A 1/2018

OTHER PUBLICATIONS

Jeong, et al., "Smartwatch Strap Wireless Power Transfer System with Flexible PCB Coil and Shielding Material", Aug. 1, 2018, 10 pages.
(Continued)

*Primary Examiner* — Nhan T Tran
(74) *Attorney, Agent, or Firm* — Colby Nipper PLLC

(57) ABSTRACT

This disclosure describes a method to calibrate a position of an optical image stabilization (OIS) lensing element 308 based on an electric current reading of one or more areas of a mobile imaging device 200. The position is a deviation from a center position, where the OIS lensing element 308 is not influenced by a force. A coupling compensation coefficient is generated based on the electric current reading. A derived value for the position is adjusted based on the coupling compensation coefficient. A scaling sensitivity coefficient is generated based on the electric current reading. The derived value for the position is further adjusted based on the scaling sensitivity coefficient. The coupling compensation coefficient and the scaling sensitivity coefficient are further based on maximum and minimum values for the Hall Effect sensor at the temperature reading and a calibration temperature.

9 Claims, 4 Drawing Sheets

(56) References Cited

U.S. PATENT DOCUMENTS

| | | | | |
|---|---|---|---|---|
| 2016/0099389 | A1 | 4/2016 | Tischler | |
| 2017/0041547 | A1* | 2/2017 | Takeuchi | H04N 23/687 |
| 2017/0223878 | A1 | 8/2017 | Lee et al. | |
| 2017/0233610 | A1 | 8/2017 | Kim et al. | |
| 2020/0412954 | A1* | 12/2020 | Gaizman | H04N 23/6812 |
| 2021/0066807 | A1 | 3/2021 | Lee et al. | |
| 2021/0396950 | A1* | 12/2021 | Park | G03B 13/36 |
| 2022/0285064 | A1* | 9/2022 | Lee | G03B 5/02 |
| 2022/0320045 | A1 | 10/2022 | Chang et al. | |
| 2023/0179020 | A1 | 6/2023 | Kim et al. | |
| 2025/0028186 | A1 | 1/2025 | Lee | |

OTHER PUBLICATIONS

Jin, Suying, “Flip Sapphire Light-Emitting Diode (LED) Chip Package”, Technical Disclosure Commons—https://www.tdcommons.org/dpubs_series/6328, Oct. 18, 2023, 9 pages.

Li, et al., “AA Wireless Charging Coil Stack-up For Thermal Mitigation And Qi Wireless Charging Coil Stack-up For Thermal Mitigation And Qi Compliance Complianc”, Technical Disclosure Commons, https://www.tdcommons.org/dpubs_series/7171, Jul. 14, 2024, 11 pages.

Weiss, et al., “Qi Compliant Wireless Charger with PCB Integrated Matnetic Material”, Jun. 2019, 5 pages.

* cited by examiner

300

RUNTIME POSTURE—POSITION INACCURACY COMPENSATION IN CAMERA OIS SYSTEMS

CROSS-REFERENCE TO RELATED APPLICATION(S)

This application claims the benefit of U.S. Provisional Patent Application Ser. No. 63/587,690, filed on Oct. 3, 2023, the disclosure of which is incorporated by reference herein in its entirety.

BRIEF SUMMARY

This disclosure describes a runtime posture-position inaccuracy compensation in camera optical image-stabilization (OIS) systems. In aspects, the method allows calibration of a position of an OIS lensing element based on an electric current reading. The electric current reading is of one or more sensors, such as a Hall Effect sensor (HES), and the position is a deviation from a center position, where the center position is the position of the OIS lensing element when it is not under the influence of a force. A coupling compensation coefficient (CCC) is generated based on the electric current reading, and a derived value for the position is adjusted based on the CCC. Additionally, a coupling compensation factor (CCF) and/or a scaling sensitivity coefficient (SSC) is generated based on an electric current reading. The adjusting of the derived value for the position is further based on the CCF and/or the SSC. The CCC, CCF, and SSC are further based on maximum and minimum values for the HES at the electric current reading and a calibration electric current.

DETAILED DESCRIPTION

Overview

Figure 1:
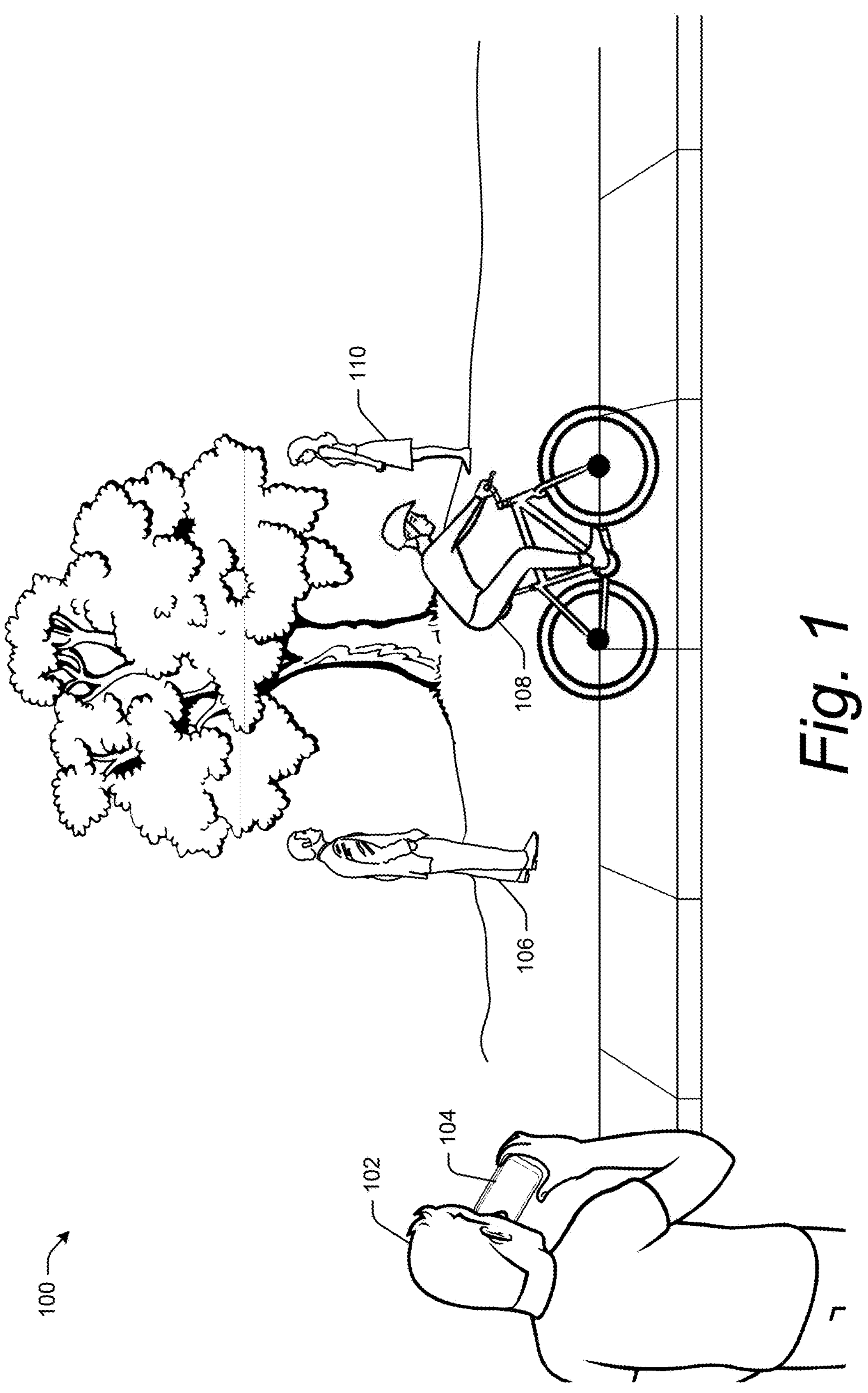
FIG. 1 illustrates an example environment for a runtime posture-position inaccuracy compensation in camera OIS systems.

The technology disclosed may generally relate to a runtime posture-position inaccuracy compensation in camera optical image-stabilization (OIS) systems. OIS systems can be impacted by electric current fluctuations, such as by electric current changes affecting a readout of a sensor. For example, sensors (Hall Effect sensor (HES), tunneling magnetoresistance (TMR) sensor, etc.) may be used to derive a position of a lensing element of the OIS system, such as a floating lens. In the example where the sensors are a single HES, the HES may give a magnetic field reading used to generate a location of a center of the lensing element. Due to the electric current fluctuations in one or more circuit elements of the OIS system, the readout from the sensors can, in aspects, provide different generated locations for the center of the lensing element when the lensing element is in the same relative position in space.

Consider a general HES output formula, such as:

$$H = \mathrm{DC}\left(H_B \cdot \frac{R}{2}\right) + \omega_M \cdot M \quad \text{Eq. 1}$$

The variables in Eq. 1 are a reading from an HES (H), an electric current reading (DC), a bias term ($H_B$), a resistance (R) a magnetic flux (M), and a magnetic coefficient ($\omega_M$). In an example, an HES is used to find the position of an OIS lens element through minor magnetic flux M variance due to the lens element's voice coil motor (VCM). However, consideration of the equation for a Hall voltage shows that Eq. 1 may have an implicit assumption:

$$V_H = -v_d B d \quad \text{Eq. 2}$$

In Eq. 2, $V_H$ is the Hall voltage, $v_d$ is the drift velocity of electrons in the HES, B is the total magnetic field magnitude, and d is a physical distance parameter of the HES. In aspects, Eq. 1 assumes that M is from the VCM. However, in a mobile imaging device there may be other sources of magnetic fields. Thus B in Eq. 2 may carry multiple source components and, as an effect, a determination of the position of the lensing element of the OIS system based on Eq. 1 with the assumption that M is strictly based on an electric current in the VCM will result in incorrect position derivation. This is called the Hall coupling effect, and can significantly contribute to errors in the determination of the position of the lensing element of the OIS system.

It is more appropriate to account for the possible difference due to magnetic and/or electric current fluctuations between the generated center point of the lensing element (e.g., using Eq. 1) and the actual center point by constructing a coupling compensation coefficient (CCC). An example formulation of such a CCC is:

$$CCC = \frac{\Delta H_{C(i_1,i_2)}}{\Delta i} \quad \text{Eq. 3}$$

In Eq. 3, $\Delta H_C$ is the lens center point, as derived by the sensor (e.g., the HES), in is a first electric current measurement, $i_2$ is a second electric current measurement, and $\Delta i$ is the difference between $i_1$ and $i_2$. The values i1 and i2 are measured at different areas of the mobile imaging device. In some examples, a coupling compensation factor (CCF) is also derived as:

$$CCF = \frac{\Delta H_{C(i_1,i_2)}}{\Delta i \cdot H_A} \quad \text{Eq. 4}$$

The variable $H_A$ is an electric current characteristic of the HES, allowing for fine-tuning of the CCC parameter using specific information about the physical HES. From Eq. 3 and Eq. 4, it is clear to see that CCF may be derived from CCC as:

$$CCF = CCC \cdot \frac{1}{H_A} \quad \text{Eq. 5}$$

According to some examples, a generation of a scaling sensitivity coefficient (SSC) is also used to calibrate the scale of the potential registration values for the HES or other sensor based on a temperature. An example equation for an SSC is:

$$SSC = \frac{\Delta H_{M,T2}}{\Delta H_{M,T1} \cdot \Delta T} \quad \text{Eq. 6}$$

In Eq. 6, $\Delta H_{M,x}$ is the difference between the maximum and minimum values possible for the HES at a temperature x, $T_1$ and $T_2$ are temperature readings, and $\Delta T$ is a difference between $T_1$ and $T_2$. The SSC allows for fine-tuning a sensor value, such as one given by the HES, from the already calibrated value given using the CCC and the CCF values. Although the CCC, CCF, and/or SSC coefficients have been shown here, additional coefficients or different formulations for these coefficients may also be used.

The technology is advantageous because it provides reliable calibration of the center point for the lensing element. For example, if the center point for the lensing element is not known by a camera device within an acceptable tolerance, images and/or videos captured using the OIS system can have artifacts, focus problems, irregularities in capture, etc. By using the CCC in calculations of the center point for the lensing element, OIS systems and devices are able to more accurately gauge the center point and, thus, provide an end user of the camera device with better image quality and an improved image capture experience.

Example Environment

FIG. 1 illustrates an example environment 100 for a runtime posture-position inaccuracy compensation in camera OIS systems, according to aspects of the disclosure. The environment 100 includes a user 102. The user is capturing imagery with a mobile device 104. The environment 100 may further include multiple subjects, such as a man 106, a bicyclist 108, and a woman 110.

In the example environment 100, the mobile device 104 used to capture the imagery is held in a hand of the user 102. As such, the mobile device 104 may experience an unwanted movement during image capture, such as shaking or tilting. In order to compensate for the unwanted movement, the mobile device 104 may include an OIS system, such as a floating lens.

Consider the user 102 using the mobile device 104 to capture imagery (photo, video, etc.) of the bicyclist 108. As the bicyclist 108 moves across the scene, the user 102 must track the bicyclist 108 with the mobile device 104. This scenario may introduce the unwanted movement. Consider the OIS system including a floating lens element (not pictured). The floating lens element may help to compensate for the unwanted movement by allowing for some movement of the mobile device 104 with no or less movement of the floating lens element. When the mobile device 104 captures imagery, in aspects, it requires knowledge about a center position of the floating lens element in order to compensate for a corresponding drift point within a camera capture element of the mobile device 104, such as a charged-coupled device (CCD).

Example Device

Figure 2:
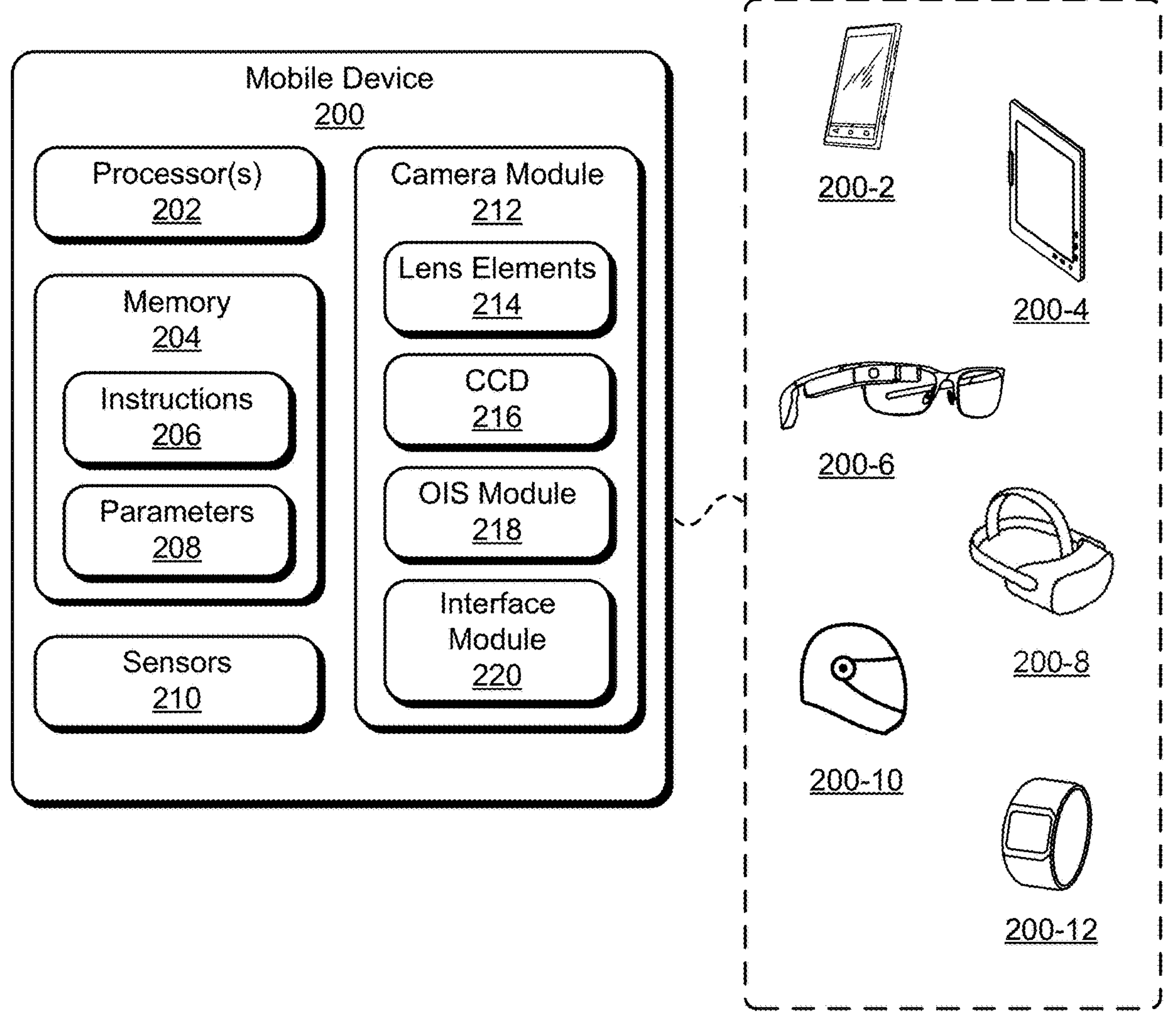
FIG. 2 illustrates an example mobile device for a runtime posture-position inaccuracy compensation in camera OIS systems.

FIG. 2 illustrates an example mobile device 200 for a runtime posture-position inaccuracy compensation in camera OIS systems. The mobile device 200 may be a smart phone 200-2, a tablet device 200-4, smart glasses 200-6, AR goggles or an AR headset 200-8, a smart helmet 200-10, a smart watch 200-12, or any other device known to a person of ordinary skill in the art where such a device is capable of capturing and processing imagery. The list of example devices given is meant to be illustrative and not limiting. The mobile device 200 may be a battery powered device.

The mobile device 200 includes one or more processors 202 and one or more computer-readable media (memory) 204. The memory 204 may include instructions 206, such as those for generating a CCC, CCF, and/or an SSC, and parameters 208. The mobile device may also, in some examples, include one or more sensors 210, such as an HES, a TMR sensor, etc. The one or more sensors 210 may, in some examples, use information or data stored in the memory 204 to calibrate output values of the one or more sensors 210. In some examples, the one or more processors 202 use the instructions 206 and/or the parameters 208 to calibrate or otherwise adjust the output values from the one or more sensors 210. The one or more sensors 210 may include sensors for determining electric current, voltage, and/or resistance values at two or more points of the mobile device 200.

The mobile device 200 also, in aspects, includes a camera module 212 for image capture, such as still imagery capture or video capture. The camera module 212 includes various elements, such as one or more lens elements 214, a charged-coupled device (CCD) 216, an OIS module 218, an interface module 220 configured to allow a user to interact with the camera module 212, etc. Though depicted as distinct elements in FIG. 2, some elements may be combined in the camera module 212. For example, the OIS module 218 may include the lens element 214 and the CCD 216. Other combinations are possible.

The mobile device 200 may also include other modules and elements not pictured. For example, the mobile device 200 can include a wireless interface, a viewing screen, an input device or module, speakers, a battery, or any number of other elements, devices, and modules common to mobile electronic devices. The elements and modules shown in FIG. 2 are meant to be illustrative and not limiting. Elements, modules, and devices not pictures are omitted for clarity and their absence should need be construed as an intentional limitation.

The one or more processors 202 and the memory 204, which includes memory media and storage media, are the main processing complex of the mobile device 200. The instructions 206 and the parameters 208 may, in aspects, be implemented as computer-readable instructions on the memory 204, which may be executed by the one or more processors 202 to provide functionalities described herein, such as the generation of the CCC, CCF, and/or the SSC.

The one or more processors 202 may include any combination of one or more controllers, microcontrollers, processors, microprocessors, hardware processors, hardware processing units, digital-signal-processors, graphics processors, graphics processing units, and the like. The one or more processors 202 may be an integrated processor and memory subsystem (e.g., implemented as a "system-on-chip"), which processes computer-executable instructions to control operations of the mobile device 200.

The memory 204 may be configured as persistent and non-persistent storage of executable instructions (e.g., firmware, recovery firmware, software, applications, modules, programs, functions, and the like) and data (e.g., user data, operational data) to support execution of the executable instructions. Examples of the memory 204 include volatile memory and non-volatile memory, fixed and removable media devices, and any suitable memory device or electronic data storage that maintains executable instructions and supporting data. The memory 204 may include various implementations of random-access memory (RAM), read-only memory (ROM), flash memory, and other types of storage memory in various memory device configurations. The memory 204 may exclude propagating signals. The memory 204 may be a solid-state drive (SSD) or a hard disk drive (HDD).

The one or more sensors 210 generally obtain contextual information indicative of operating conditions (virtual or physical) of the mobile device 200 or the surroundings of the mobile device 200. The mobile device 200 monitors the operating conditions based in part on sensor data generated by the one or more sensors 210. Additional examples of the one or more sensors 210 include movement sensors, temperature sensors, position sensors, proximity sensors, light sensors, infrared sensors, moisture sensors, pressure sensors, electric current sensors, voltage sensors, resistance sensors, and/or inductance sensors.

The interface module 220 may act as an output and input component for obtaining user input and providing a user interface. As an output component, the interface module 220 may be a display, a speaker or audio system, a haptic-feedback system, or another system for outputting information to a user (e.g., the user 102). When configured as an input component, the interface module 220 can include a touchscreen, a microphone, a physical button or switch, a radar input system, or another system for receiving input from the user. Other examples of the interface module 220 include a mouse, a keyboard, a fingerprint sensor, or an optical, an infrared, a pressure-sensitive, a presence-sensitive, or a radar-based gesture detection system. The interface module 220 often includes a presence-sensitive input component operatively coupled to (or integrated within) a display.

When configured as a presence-sensitive screen, the interface module 220 detects when the user provides two-dimensional or three-dimensional gestures at or near the locations of a presence-sensitive feature. In response to the gestures, the interface module 220 may output information to other components of the mobile device 200 to indicate relative locations (e.g., X, Y, Z coordinates) of the gestures, and to enable the other components to interpret the gestures. The interface module 220 may output data based on the information generated by an output component or an input component which, for example, may be used to capture imagery using the camera module 212.

Example Optical Image-Stabilization System

Figure 3:
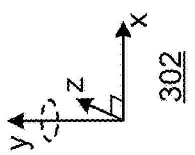
FIG. 3 illustrates an example OIS system for a runtime posture-position inaccuracy compensation in camera OIS systems.
Figure 3:
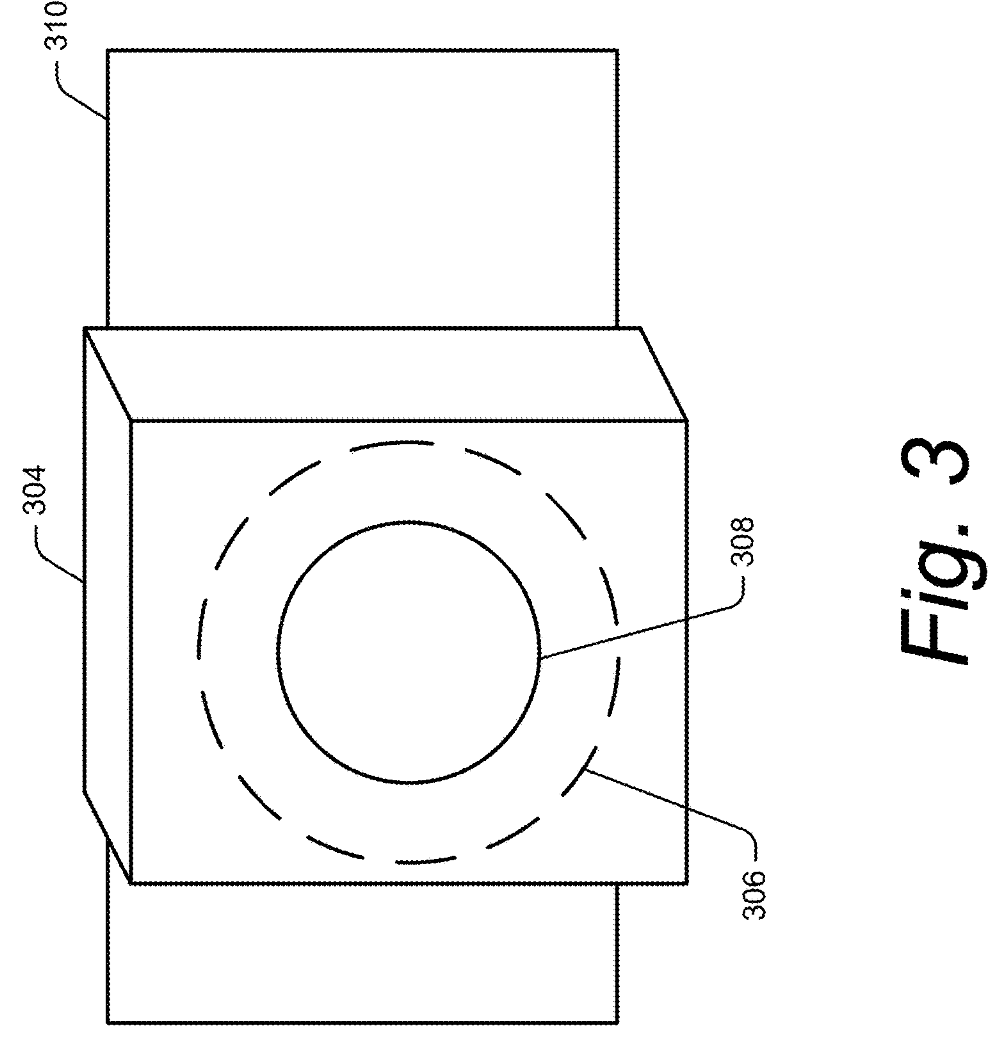

FIG. 3 illustrates an example OIS system 300 for a runtime posture-position inaccuracy compensation in camera OIS systems. The OIS system 300 is illustrated with respect to a coordinate system 302, the coordinate system including an x axis, y axis, and z axis. The OIS system includes a floating lens assembly 304, the floating lens assembly 304 including a floating coupler 306 and a lens 308. The lens 308 is coupled to a housing of the floating lens assembly 304 via the coupler 306. The OIS system 300 further includes a CCD 310.

The arrangement of the components of the OIS system 300 are shown relative to the coordinate system 302. The lens 308 is substantially parallel with the x-y plane, as is the CCD 310. The lens 308 is arranged such that it is orthogonal to the z axis, as is the CCD 310. As the CCD 310 and the lens 308 are orthogonal to the z axis, light incident on the lens 308 from the z axis direction will also be incident on the CCD 310.

Consider an example when the OIS system 300 is moved, such as by the user 102 moving the electronic device 104 of FIG. 1. The lens 308 will not immediately move with the rest of the OIS system 300 as it is floating in the floating lens assembly 304. However, the CCD 310 is not similarly floating, so a center point of the lens 308 will move relative to the CCD 310. One or more sensors may be used (e.g., the one or more sensors 210 of FIG. 2) to determine a shift in the center point. However, the output of the one or more sensors may be affected by electric current and/or associated magnetic field fluctuations within the OIS system 300. An incorrect reading from the one or more sensors may cause a false position determination of the center point of the lens 308. The generation of a CCC, including the possible generation of a CCF and/or an SSC, can be used to correct for readings used to determine the center point of the lens 308, as disclosed herein.

Example Implementation

Figure 4:
FIG. 4 illustrates an example logical flow diagram for a runtime posture-position inaccuracy compensation in camera OIS systems.
Figure 4:
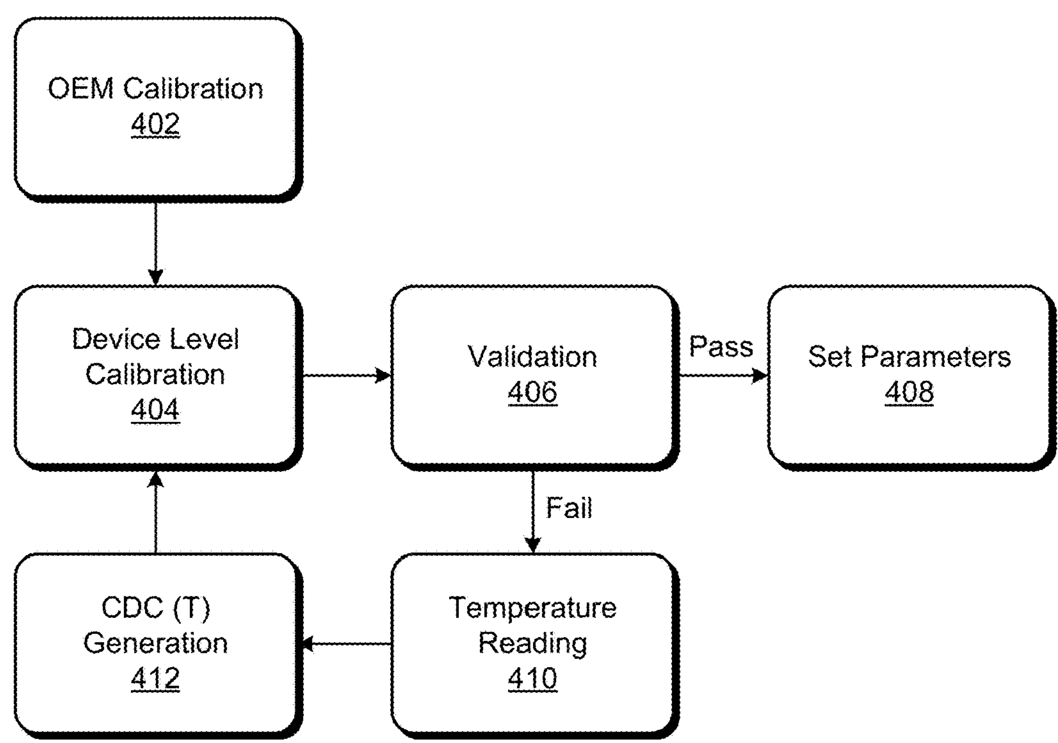

FIG. 4 illustrates an example logical flow diagram 400 for a runtime posture-position inaccuracy compensation in camera OIS systems, according to aspects of the disclosure. At 402, an initial current compensation is performed. For example, a mobile image capture device (e.g., the mobile device 200) may be factory calibrated for an HES used in an OIS system. The initial current compensation may include derivations of an electric current in a VCM, an electric current in the HES, or other electric currents that may be present in the mobile image capture device. The initial current compensation may be, in aspects, performed at the time one or more sensors (e.g., the sensors 210) are manufactured.

At 404, a device-level calibration is performed. The device-level calibration, in some examples, accounts for input from one or more sensors of the mobile image capture device, including at least an electric current reading. The device-level calibration, in aspects, uses at least a CCC (e.g., Eq. 3) and may also use a CCF (e.g., Eq. 4) and/or an SSC (e.g., Eq. 6). The device-level calibration accounts for a shift in a center position of a lens of an OIS system due to magnetic field fluctuation.

At 406, the device-level calibration is validated. For example, one or more processors (e.g., the one or more processors 202) of the mobile imaging device may compare the CCC with a threshold value. The validation, for example, may be a binary validation classification, such as a pass/fail result. If the validation passes, the logical flow diagram 400 proceeds to 408, where one or more parameters are set to account for the shift in the center position of the lens of the OIS system due to the magnetic field fluctuations. If the validation fails, the logical flow diagram 400 proceeds to 410, where an electric current reading of i is taken. At 412, another CCC value is generated, which is dependent on i. At 404, a new device-level calibration is performed and the logical flow diagram 400 proceeds from there. In aspects, the electric current reading i can be multiple electric current values from two or more points on the mobile image capture device, a difference in the two or more electric currents, etc.

According to some examples, CCC, CCF, and/or SSC values may be stored in a memory of the mobile image capture device (e.g., the parameters 208). In other examples, the CCC, CCF, and/or SSC values may be generated by the one or more processors. According to some examples, the validation may have a limit on the number of times it can fail to avoid an infinite-loop error.

In some examples where the CCC, CCF, and/or SSC values are generated by the one or more processors based on the electric current i, the CCC, CCF, and/or SSC values may be compared to previous and/or predetermined CCC, CCF, and/or SSC values for the electric current, the previous and/or predetermined CCC, CCF, and/or SSC values for the electric current stored in the memory. In some examples, comparison of the CCC, CCF, and/or SSC values generated by the one or more processors based on the electric current and the previous and/or predetermined CCC, CCF, and/or SSC values for the electric current includes updating or otherwise adjusting, by the one or more processors, the CCC, CCF, and/or SSC values generated by the processors based on the electric current.

CONCLUSION

While the present subject matter has been described in detail with respect to various specific example implementations thereof, each example is provided by way of explanation, not limitation of the disclosure. Those skilled in the art, upon attaining an understanding of the foregoing, can readily produce alterations to, variations of, and equivalents to such implementations. Accordingly, the subject disclosure does not preclude inclusion of such modifications, variations, and/or additions to the present subject matter as would be readily apparent to one of ordinary skill in the art. For instance, features illustrated or described as part of one implementation can be used with another implementation to yield a still further implementation. Thus, it is intended that the present disclosure cover such alterations, variations, and equivalents.

What is claimed is:

1. A method for optical image stabilization (OIS), the method comprising:

receiving, by one or more processors, two or more electric current readings from one or more sensors;

generating, by the one or more processors and based on the two or more electric current readings, a coupling compensation coefficient for a lensing element;

comparing, by the one or more processors, the coupling compensation coefficient with a plurality of saved coupling compensation coefficient values, each of the plurality of saved coupling compensation coefficient values associated with at least one electric current value;

adjusting, by the one or more processors and based on the comparison of the coupling compensation coefficient with the plurality of saved coupling compensation coefficient values, the coupling compensation coefficient; and adjusting, by the one or more processors and based on the adjusted coupling compensation coefficient, a position value for the lensing element.

2. The method of claim 1, wherein the two or more electric current readings are based on two or more distinct portions of a mobile imaging device, the mobile imaging device comprising the lensing element.

3. The method of claim 2, wherein the coupling compensation coefficient is further generated based on a physical parameter of a Hall Effect Sensor.

4. The method of claim 1, wherein the adjusting of the coupling compensation coefficient comprises:

receiving, by the one or more processors, a second set of two or more electric current readings from the one or more sensors; and generating, by the one or more processors and based on the second set of two or more electric current readings, a new coupling compensation coefficient for the imaging element.

5. The method of claim 1, wherein the position value for the lensing element is a deviation from a center position, the center position being the position of the lensing element when it is not under the influence of a force.

6. The method of claim 1, further comprising generating, by the one or more processors and based on a temperature reading from the one or more sensors, a scaling sensitivity coefficient (SSC), wherein:

the scaling sensitivity coefficient is based on a maximum possible reading and a minimum possible reading of one of the one or more sensors; and the adjusting of the position value for the lensing element is further based on the SSC.

7. The method of claim 6, wherein the one or more sensors are a Hall Effect Sensor and the scaling sensitivity coefficient is further generated based on:

a maximum value of the Hall Effect Sensor at the temperature reading;

a minimum value of the Hall Effect Sensor at the temperature reading;

a maximum value of the Hall Effect Sensor at a calibration temperature value; and a minimum value of the Hall Effect Sensor at the calibration temperature value.

8. A method for optical image stabilization (OIS), the method comprising:

receiving, by one or more processors, two or more electric current readings from one or more sensors;

generating, by the one or more processors and based on the two or more electric current readings, a coupling compensation coefficient for a lensing element;

adjusting, by the one or more processors and based on the generated coupling compensation coefficient, a position value for the lensing element; and generating, by the one or more processors and based on a temperature reading from the one or more sensors, a scaling sensitivity coefficient (SSC), wherein:

the scaling sensitivity coefficient is based on a maximum possible reading and a minimum possible reading of one of the one or more sensors; and the adjusting of the position value for the lensing element is further based on the SSC.

9. The method of claim 8, wherein the one or more sensors are a Hall Effect Sensor and the scaling sensitivity coefficient is further generated based on:

a maximum value of the Hall Effect Sensor at the temperature reading;

a minimum value of the Hall Effect Sensor at the temperature reading;

a maximum value of the Hall Effect Sensor at a calibration temperature value; and a minimum value of the Hall Effect Sensor at the calibration temperature value.

* * * * *